Oct. 6, 1959     J. SEJOURNET     2,907,454
HOT EXTRUSION DIE

Filed Sept. 26, 1955     3 Sheets-Sheet 1

Oct. 6, 1959 J. SEJOURNET 2,907,454
HOT EXTRUSION DIE
Filed Sept. 26, 1955 3 Sheets-Sheet 2

INVENTOR.
Jacques Sejournet
BY
Webb, Mackey & Burden
HIS ATTORNEYS

United States Patent Office 2,907,454
Patented Oct. 6, 1959

2,907,454

HOT EXTRUSION DIE

Jacques Sejournet, Paris, France, assignor to Societe Anonyme dite: Comptoir Industriel d'Etirage et Profilage de Metaux, Paris, France, a corporation of France Application September 26, 1955, Serial No. 536,551

Claims priority, application France September 30, 1954

1 Claim. (Cl. 207—17)

The present invention relates to the hot extrusion of metals.

The usual methods of hot extrusion of metals and alloys by means of an extrusion press, and especially of non-ferrous metals and alloys such as aluminium, light alloys, copper, brass and bronzes, enable rods and tubes to be obtained, the surfaces of which are, in general, sufficiently smooth to give products which are usable in their actual state, that is to say without additional operations.

In order to improve the efficiency and the quality of extruded products with the usual methods, it has already been proposed to introduce a lubricant between the billet and the extrusion tools. Such a lubrication has been used, for example, in the extrusion at high temperature of steels, bronzes and molybdenum, so as to eliminate the defect of a hollow in the rear portion of the extruded product. In order to protect the billets against oxidation during the heating stage, it has also been proposed to cover the billet with salts, glass or slags.

It has, however, been found that this introduction of lubricants, either between the billet and the container, or between the billet and the die, or both between the billet and the container and the billet and the die, while it makes for high efficiency and, in general, a better quality of the extruded products, leads in certain cases to conditions of surface of the said extruded products which are rougher than those obtained by the usual methods of extrusion without the introduction of lubricant. This is especially the case with stainless chromium steels in the field of ferrous metals and with bronzes and light alloys in the domain of non-ferrous metals.

An object of the invention is to provide means for the hot extrusion of metals and alloys, with the use of a lubricant passing between the extruded metal and the die, which make it possible to obtain sections having a substantially smooth surface, free from accidental grooves of substantial depth.

Another object of the invention is to provide means for the hot extrusion, with the use of a lubricant passing between the extruded metal and the die, of sections of metals which are difficult to extrude without using a lubricant, said means making it possible to obtain sections having substantially the same smooth surface as if they were made of metals which can easily be extruded without use of a lubricant.

According to the invention, the extrusion operation is carried out in a first stage of deformation and then in at least one smoothing stage, for example, by extruding through at least two axially aligned successive die holes formed in one or more die blocks, the successive die holes being separated by a clearance space or lubricant chamber formed by a clearance portion at the exit end of a die hole and a flared portion at the entrance end of an adjacent die hole.

A die for carrying out the extrusion operation comprises at least two axially aligned successive die holes, each of which is separated from that following by a clearance space or lubricant chamber formed of a clearance portion for the first die hole and an entry portion for the second die hole. The die holes may be formed in one single die block or in different die blocks mounted end to end in any suitable manner. The walls of the various die holes of the single die block or of the successive die blocks may be of the same length or of different lengths. The axial-sectional profiles of the entry portions may be the same or different.

The respective diameters of the successive die holes are chosen in such manner that they produce the correct smoothing effect on the extruded product. These diameters are always very close in size to each other, the diameter of the first die hole in the chain of die holes being greater than or at least equal to that of the following die holes, account being taken of the deformation to which the die holes are subjected by the extrusion forces and temperatures.

The volume of the clearance spaces between the successive die holes should be sufficient to contain the excess of lubricant which passes through each die hole. In this way, accumulation of lubricant is avoided in a too narrow annular space which would prevent the successive die holes from performing their functions properly. To this end, one or more channels may be drilled in the walls of the dies in order to provide a communication between the clearance spaces and the external surface of the die structure so as to enable the lubricant to be evacuated if this is required.

For the extrusion of round bars or tubes, the successive die holes (or calibrating or bearing portions) have their centers in alignment with the axis of extrusion. In the case of extrusion of non-circular sections, the positions of the centers of gravity of the extrusion surfaces are determined by trial and error so as to avoid any torsion of the section obtained by extrusion.

The invention is explained in more detail in the following description with reference to the appended drawings, in which.

Figure 1:
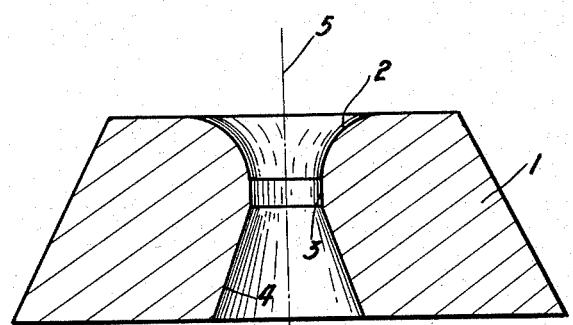
Fig. 1 is a view in cross section of a known type of die.

The die shown in Figure 1 comprises a die block 1, having a curved entry portion 2, a calibrating or bearing portion or die hole 3 and a clearance portion 4, the axis of extrusion being indicated at 5.

Figure 2:
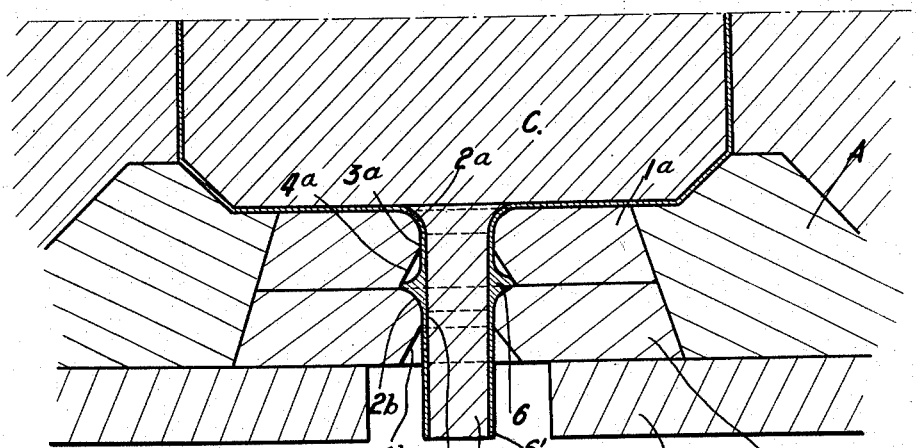
Fig. 2 is a longitudinal cross section of a double die block in accordance with the invention, comprising two die holes having substantially the same length and the same flared entry profile, the diameter of the first die hole being at least equal to that of the second die hole.

The double die shown in Figure 2 in accordance with the invention comprises two die or die blocks 1a and 1b, mounted in a die holder shown in a general way at A, a clamping member B being provided for the application of the two successive dies against each other. The entry or forming die 1a comprises a curved entry portion 2a, a calibrating portion 3a and a clearance portion 4a. The second die or smoothing die 1b comprises a curved entry portion 2b, a calibrating portion 3b and a clearance portion 4b. Between the dies 1a and 1b, the clearance portion 4a of the die 1a and the entry portion 2b of the die 1b form a clearance space. The method of operation of this double die is as follows.

A billet C, which is coated in known manner with a layer of vitreous lubricant, is placed in the container behind the die 1a. Under the action of the press, the metal of the billet is first of all extruded through the said die 1a. This metal is coated with a thin layer 6 of lubricant. For the sake of clarity of the drawing, the said layer has been shown diagrammatically with a thickness which has been exaggerated. The lubricant of the layer 6 partly accumulates in the clearance space comprised between the clearance portion 4a and the curved entry portion 2b, and the metal of the billet continues to be extruded through the bearing portion 3b of the die 1b. When it passes out of the die 1b, it is found that the extruded bar C' has a very smooth surface and that it is coated with a layer 6' of lubricant which is much thinner than the corresponding coating which is obtained at the exit side of a single die of the usual kind, such as that shown in Figure 1. The surface conditions obtained by the combined use of the two dies 1a and 1b are identical with those which can be obtained by the extrusion of metals which are easy to transform without the use of lubricant.

Figure 3:
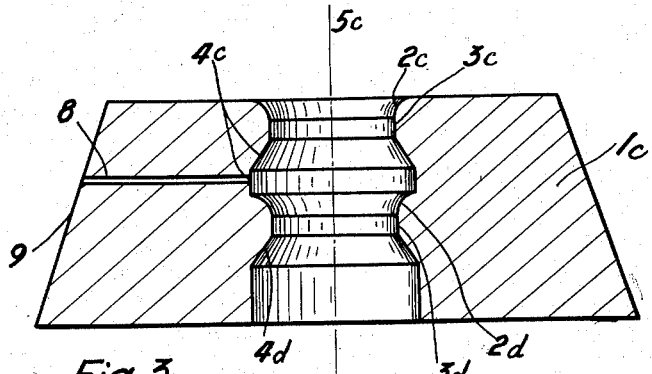
Fig. 3 is a view in cross section of a single die block in accordance with the invention, comprising two die holes having substantially the same length and provided with the same flared entry profile, the diameter of the first hole being at least equal to that of the second die hole.

The same results can be obtained by using a single die block of the kind shown in Figure 3. The die block 1c is bored from the container side and about the axis of extrusion 5c, successively to form the curved entry portion 2c, the first bearing portion 3c and the first clearance portion 4c, and then to form the second curved entry portion 2d, coupled to the clearance portion 4c, the second bearing portion 3d and the clearance portion 4d. Channels 8 are drilled in the block 1c in order to enable the clearance space defined by the extruded bar, the clearance portion 4c and the curved entry portion 2d to communicate with the exterior surface 9 of the block 1c.

The method of operation of this single block die is the same as for that of the die shown in Figure 2. The excess of lubricant which collects in the space between the bar, the clearance 4c and the curved entry portion 2d is evacuated to the exterior through the channels 8.

Figure 2A:
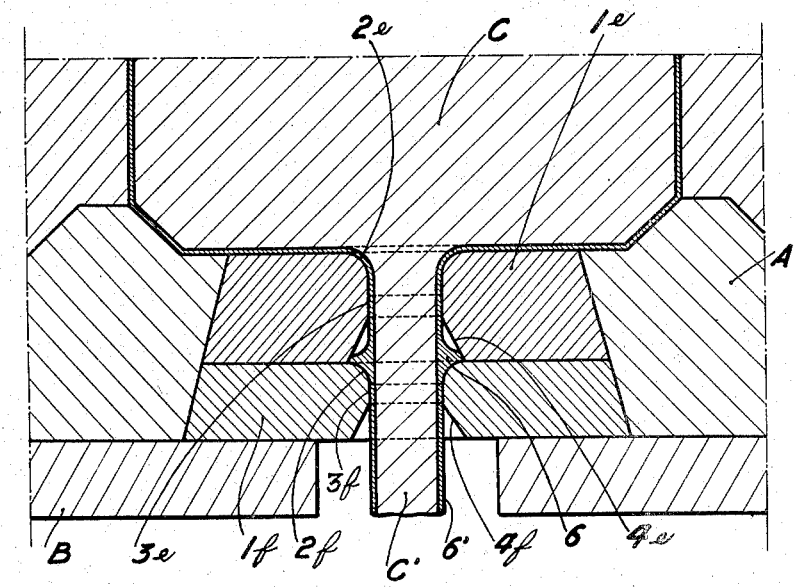
Fig. 2a is a section similar to the section of Fig. 2 but showing a double die block including two die holes of different lengths.

In Figures 2a, parts corresponding to parts 1a to 4a of Figure 2 have been designated by reference characters 1e to 4e and parts corresponding to parts 1b to 4b have been designated by reference characters 1f to 4f.

Figure 3A:
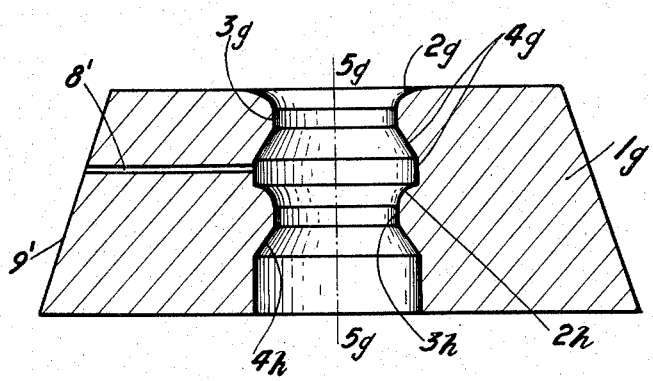
Fig. 3a is a section similar to the section of Fig. 3 but showing a single die block including two die holes having different flared entry profiles.

In Figure 3a, parts corresponding to parts 1c to 5c of Figure 3 have been designated by reference characters 1g to 5g and parts corresponding to parts 2d to 4d have been designated by reference characters 2h to 4h. Further, items corresponding to 8 and 9 of Figure 3 have been numbered 8' and 9' in Figure 3a.

With the object of greater clarity of specification as concerns the choice of the dimensions of the dies employed in accordance with the invention, their application to the extrusion of steel and to various non-ferrous alloys will now be described.

*Example 1*

Extrusion of tubes of 18–8 stainless steel of the American type 304:

The extrusion was carried out in a press of 1500 tons, using billets of 143 mm. diameter, 65 mm. bore, and 450 mm. in length, heated to 1240° in a bath of molten barium chloride.

Lubrication was effected on the outer surface of the billet by means of glass veil, and on the die by means of a disc of glass of 400 grams in weight, obtained by the agglomeration of grains of glass with 3% of sodium silicate. The mandrel was lubricated with glass fabric.

Figure 4:
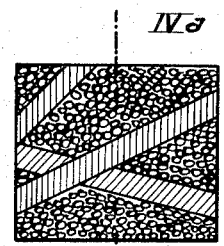
Figs. 4 and 4a are, respectively, a plan view and a cross section on the line IVa—IVa of Figure 4, showing the surface of a tube of 18–8 stainless steel obtained by extrusion in a die of the type shown in Figure 1 having a single die hole.
Figure 4A:
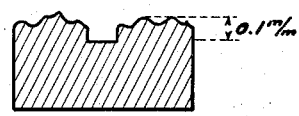

In the first place, a single die block of the type shown in Figure 1 was used. The radius of curvature of an axial section through the entry portion 2 was 10 mm., the diameter of the bearing portion 3 was 6 mm., and the angle made by the clearance portion 4 with the axis 5 of the die was 7°. The total height of the die was 25 mm. With this single die, there was obtained a tube of 64 mm. external diameter, 58 mm. bore and a total length of 8.6 meters. The surface of the said tube exhibited, especially on the first three meters extruded, slight grooves with an average depth of 0.1 mm. (see Figure 4).

Figure 5:
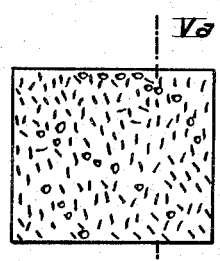
Figs. 5 and 5a show corresponding views of the surface condition obtained after extrusion of stainless steel through a die having two die holes in accordance with Figure 2.
Figure 5A:
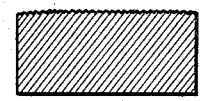

An assembly of two dies, 1a and 1b, was then employed, such as shown in Figure 2, the die 1a having a bearing portion 3a whose diameter was greater by 1.5 mm. than the bearing portion 3b of die 1b. While working under the same conditions of extrusion, it was found that the extruded rod had a perfectly smooth surface over the whole of its length, this advantage being especially noticeable over the first three meters (see Figure 5) which, in the previous case, showed the small grooves referred to above.

*Example 2*

Extrusion of rods of light alloy, type 75S, having the following composition:

| | |
|---|---|
| Cu | 1.6 |
| Zn | 5.6 |
| Mg | 2.5 |
| Mn | 0.2 |
| Cr | 0.3 |
| Al | 89.8 |

The extrusion was carried out in a press of 5000 tons in a container of 285 mm. in diameter, starting from billets having a diameter of 273 mm. a length of 508 mm., heated to 410° C. in a standard type of furnace. The lubrication of the die was effected by means of a plate arranged in known manner and made of a glass which is viscous at the working temperature.

Figure 6:
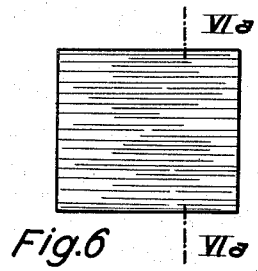
Figs. 6, 6a, 7 and 7a are, respectively, similar views of the conditions of surface obtained with extruded sections of aluminum.
Figure 6A:
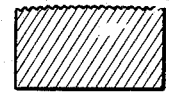

In the case of a single die (Figure 1) having the dimensions given in the first part of Example 1, there was obtained, after removal of the thin coating of lubricant which covered the extruded rod, a rod having a diameter of 62.5 mm. and a length of 8.30 meters, the surface of which had along the whole of its length, fine longitudinal scratches having an average depth of the order of 0.1 mm. (see Figure 6).

Figure 7:
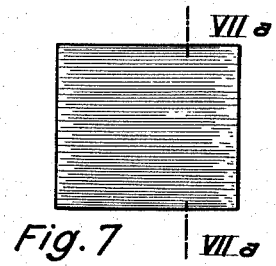
Figure 7A:
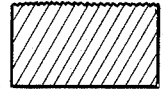

By working, in conformity with the present invention, with a double die (see Figure 2), the die 1b having in this case a bearing portion 3b whose diameter was less by 1 mm. than that of the bearing portion 3a in die 1a there was obtained a rod having a surface which was much smoother than that obtained in the first case, the mean depth of the scratches being brought down to 0.02 mm. (see Figure 7).

*Example 3*

Extrusion of 65% Cu and 35% Zn brass rods:

The extrusion was carried out in a press of 1500 tons, starting from billets of 145 mm. in diameter and 350 mm. in length, heated to 700° C. in a standard type of molten salt bath. Lubrication was effected on the billet by means of the salt itself, and on the die by means of a bundle of 250 grams of ordinary glass fiber.

With a single die such as that described with reference to Figure 1, there were obtained bars in the form of round sections of 30 mm. in diameter and 8 meters in length, the surface of which shows at the same time grooves of 0.1 mm. in depth as in the case of Example 1, and scratches of the same depth as in Example 2.

When this single die was replaced by a double die in conformity with that shown in Figure 2, the diameters of the bearing portions 3a and 3b of the dies 1a and 1b being in this case identically the same, the rods obtained were perfectly smooth.

It is quite clear that the method and the die in accordance with the present invention may be used, not only for the extrusion of metals or alloys which are recognized as being difficult to extrude, but also for the extrusion of all other metals or alloys, the quality of the extrusion being increased in each case with respect to the quality usually obtained. Lubricants can also be employed with the specific object of giving higher efficiencies. The method and die in accordance with the invention may also be combined with the various known methods and dies employed in extrusion with dry lubrication, the separation of the extrusion base, the assembly of the dies, etc.

What I claim is:

An extrusion die structure for extruding a metal billet from a press, said die structure comprising a first die and a second die axially aligned with each other, each die including a curved entry portion at its entrance end, a clearance portion at its exit end and a bearing portion intermediate its entrance and exit ends, said first die being a reducing die, the diameter of the bearing portion of said first die being at least equal to the diameter of the bearing portion of said second die, the clearance portion of said first die and the entry portion of said second die forming a lubricant chamber for excess lubricant, and a channel leading from said lubricant chamber to the external surface of the die structure to enable excess lubricant to be evacuated from said lubricant chamber.

References Cited in the file of this patent

UNITED STATES PATENTS

| | | |
|---|---|---|
| 401,208 | Rapp | Apr. 9, 1889 |
| 413,460 | Roney | Oct. 22, 1889 |
| 1,817,680 | Pratt | Aug. 4, 1931 |
| 1,896,674 | Longwell | Feb. 7, 1933 |
| 2,164,750 | Nadler | July 4, 1939 |
| 2,538,918 | Sejournet et al. | Jan. 23, 1951 |
| 2,539,716 | Bairstow et al. | Jan. 30, 1951 |
| 2,559,679 | See | July 10, 1951 |
| 2,664,996 | Andrews | Jan. 5, 1954 |
| 2,731,145 | Kritscher | Jan. 17, 1956 |
| 2,778,493 | Kreidler | Jan. 22, 1957 |
| 2,846,056 | Hampton | Aug. 5, 1958 |

FOREIGN PATENTS

| | | |
|---|---|---|
| 66,546 | Switzerland | Nov. 18, 1913 |
| 500,212 | Great Britain | Feb. 6, 1939 |
| 906,925 | Germany | Mar. 18, 1954 |